US006830364B2

(12) United States Patent
Ter-Oganesian

(10) Patent No.: US 6,830,364 B2

(45) Date of Patent: Dec. 14, 2004

(54) VEHICLE LIGHT ASSEMBLY

(76) Inventor: Zorak Ter-Oganesian, 507 E. Cedar Ave., #203, Burbank, CA (US) 91501

(*) Notice: Subject to any disclaimer, the term of this patent is extended or adjusted under 35 U.S.C. 154(b) by 0 days.

(21) Appl. No.: 10/382,670

(22) Filed: Mar. 5, 2003

(65) Prior Publication Data

US 2003/0142505 A1 Jul. 31, 2003

Related U.S. Application Data

(63) Continuation-in-part of application No. 09/991,515, filed on Nov. 16, 2001, now abandoned.

(60) Provisional application No. 60/250,940, filed on Dec. 2, 2000.

(51) Int. Cl.[7] .................................................. F21V 7/00

(52) U.S. Cl. ....................... 362/518; 362/545; 362/241; 362/247

(58) Field of Search ................................ 362/518, 545, 362/241, 247, 305, 304, 297, 346, 348, 349, 240, 516, 517, 800, 544, 243, 301, 302

(56) References Cited

U.S. PATENT DOCUMENTS 4,929,866 A * 5/1990 Murata et al. .............. 313/500
4,935,665 A * 6/1990 Murata ....................... 313/500
5,054,885 A * 10/1991 Melby ........................ 359/618
5,136,483 A * 8/1992 Schoniger et al. .......... 362/545
5,698,866 A * 12/1997 Doiron et al. ................ 257/99
5,803,579 A * 9/1998 Turnbull et al. ............ 362/516
6,238,073 B1 * 5/2001 Ito et al. ..................... 362/544
6,281,620 B1 * 8/2001 Yeh ............................ 313/113
6,367,949 B1 * 4/2002 Pederson .................... 362/240
6,380,865 B1 * 4/2002 Pederson ............... 340/815.45
6,406,172 B1 6/2002 Harbers et al.
6,520,669 B1 2/2003 Chen et al.
6,550,950 B1 4/2003 Fernandez
6,565,247 B2 5/2003 Thominet
6,601,982 B1 8/2003 Begemann et al.
2001/0019486 A1 9/2001 Thominet

* cited by examiner

*Primary Examiner*—Thomas M. Sember
*Assistant Examiner*—B Q T
(74) *Attorney, Agent, or Firm*—Kelly, Lowry & Kelly, LLP

(57) ABSTRACT

A vehicle light assembly includes a reflector having apertures formed in a circumferential wall thereof which are configured to accept light emitting diodes therethrough in an orientation generally perpendicular to the circumferential wall. The reflector includes a reflective protuberance, which is typically multi-faceted, extending upwardly from an interior surface of the reflector and generally centered with respect to the light emitting diodes. Each facet of the protuberance directs light from the light emitting diodes to an upper lens. Multiple ridges extend upwardly from the interior surface of the reflector at approximately forty-five degree angles with respect to the light emitting diodes for directing the light emitted from the light emitting diodes to the lens. The configuration of the reflector enables the use of fewer light emitting diodes.

29 Claims, 1 Drawing Sheet

10
14
24
16
22
38
20
18
36
34
32
30
26,28
12

VEHICLE LIGHT ASSEMBLY

RELATED APPLICATION

This application is a continuation-in-part of U.S. application Ser. No. 09/991,515, filed Nov. 16, 2001, now abandoned, which claims priority from U.S. Provisional Application Ser. No. 60/250,940, filed Dec. 2, 2000.

BACKGROUND OF THE INVENTION

The present invention generally relates to lights and reflector assemblies. More particularly, the present invention relates to an LED and reflector assembly for use in clearance and safety lights for heavy duty vehicles, commercial trucks and truck trailers, boat trailers, busses, recreational vehicles and other vehicles.

Vehicle warning and safety light assemblies are typically equipped with conventional filament light bulbs which have a number of well-known problems. For example, the light bulbs draw excessive current. Under certain conditions are not bright enough to see from a trailing vehicle. Moreover, traditional light bulbs have a relatively short life span, requiring frequent replacement. Failure to replace such light bulbs promptly can create an unsafe vehicle condition, and possible injury not only to those within the vehicle but also to persons in other vehicles as well.

Light emitting diodes (LED's) have recently been developed for use as a light source in motor vehicle light assemblies. An advantage to using LED's is that they typically have an operating life of as much as 100,000 hours before they begin to degrade. LED's also draw less current from the vehicle's electrical system and emit more light than similarly configured or styled filament light bulbs. LED lighting assemblies have also been found to have better visibility in fog and bad weather and reduce the reaction time during braking. The light emitted from the LED is sharper, brighter and has better visibility from a distance.

However, existing LED light assemblies have been found to have certain disadvantages. The light produced by LED's is a directional light, like a laser beam, with a given specific angle. Currently, LED's are clustered tightly together to achieve a uniform light. These cluster assemblies aggregate the LED's in a position which allows the assembly to pass Department of Transportation light output requirements when viewed from a "top" angle. These assemblies use flat lens or covers which affects the viewing angle. If the viewing angle is changed or the LED is improperly positioned, insufficient light is emitted. Such LED assemblies are covered with a lens, typically red or amber in color. In some models, there is no use of optics whatsoever and the lens is merely a cover for protection.

Such LED clusters have been found to be expensive to produce due to the high number of LED's required. Also, the high number of LED's create an enormous amount of heat which prematurely degrades the life span of such assemblies. To date, there has been no use of reflectors or reflective surfaces to enhance the light output of LED assemblies due to the fact that the train of thought in the industry is that the use of reflectors or reflective surfaces is impractical or ineffective due to the directional light emitted from the LED.

Accordingly, what is needed is an LED assembly which requires fewer LED's. What is also needed is an LED assembly which incorporates an effective reflector to enhance the light output of the assembly. The present invention fulfills these needs and provides other related advantages.

SUMMARY OF THE INVENTION

The present invention resides in an automobile reflector assembly which is configured to allow the use of only a few LED's in each light assembly.

The assembly of the present invention generally comprises a plurality of light emitting diodes, and a reflector having apertures formed in a circumferential wall thereof which are configured to accept the light emitting diodes therethrough in an orientation generally perpendicular to the circumferential wall.

A lens is disposed over the reflector and light emitting diodes. The lens may be of a red or amber color, or transparent when the light emitting diodes emit red or amber light. A base is attached to the lens and with the lens cooperatively houses the light emitting diodes, the reflector and circuitry associated with the light emitting diodes.

The reflector includes a reflective protuberance extending upwardly from an interior surface of the reflector and centered with respect to the light emitting diodes. Typically, the protuberance comprises a generally conical structure having multiple facets. Each facet faces a light emitting diode for directly light from the light emitting diode to the lens. The facets of the conical structure are directed at an approximately forty-five degree angle with respect to the light emitting diode. Preferably, a concave depression is formed in each facet. Each concave depression is generally aligned with a light emitting diode for directing light from the light emitting diode to the lens above the reflector.

The reflector preferably also includes multiple ridges extending upwardly from an interior surface thereof at approximately forty-five degree angles with respect to the light emitting diodes for directing the light emitted from the light emitting diodes to the lens. These ridges include base ridges descending in stepped fashion from the aperture to the cone, and partition ridges which are elevated with respect to the base ridges and descend in step fashion from the circumferential wall towards the cone. Preferably, the base ridges include dimples or bumps thereon for further dispersing the light from the light emitting diode. The lens in this embodiment does not necessarily include special optics, and may be of a standard and flat lens variety.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawing illustrates the invention. In such drawing:

DETAILED DESCRIPTION OF THE PREFERRED EMBODIMENT

Figure 1:
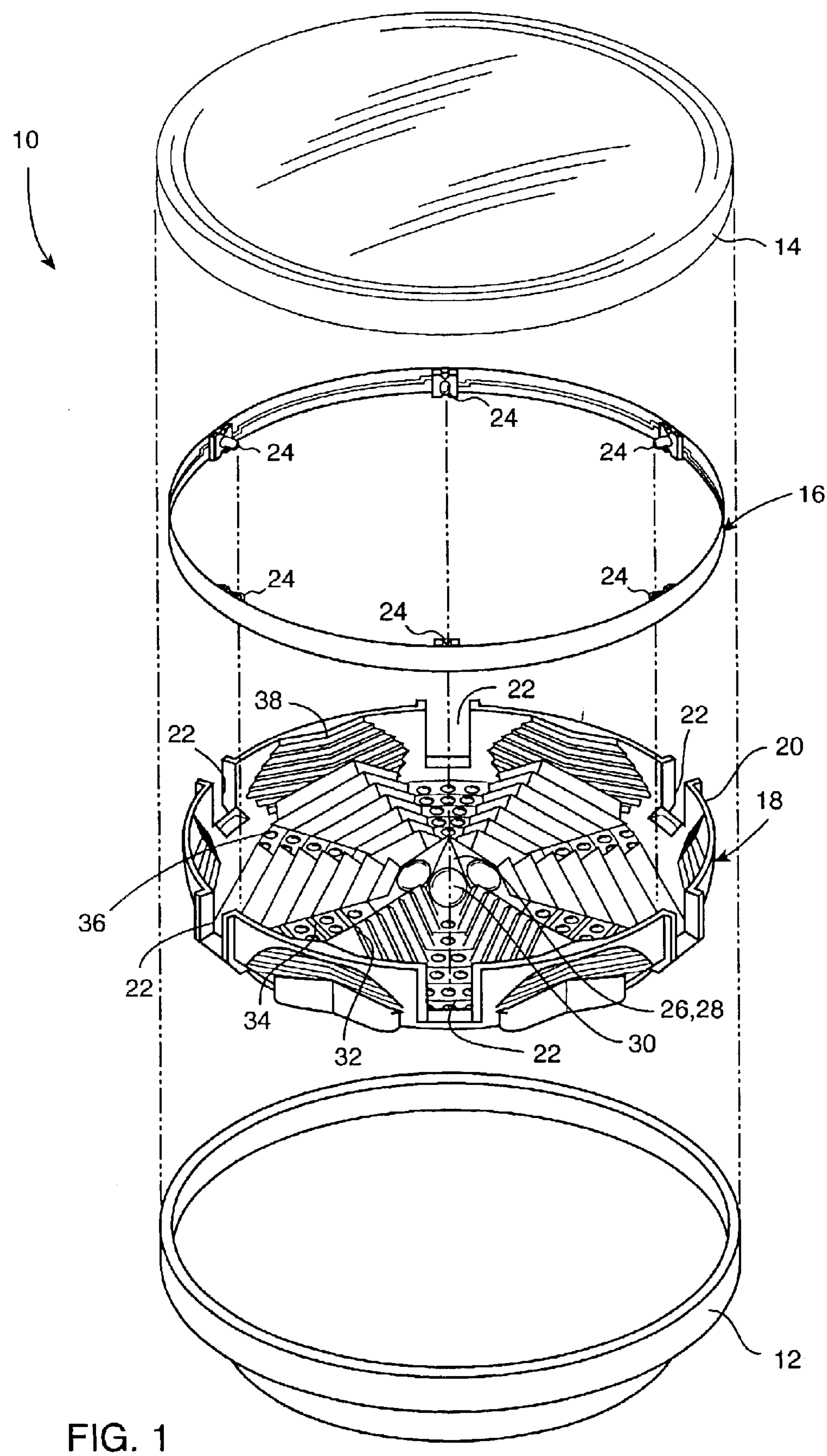
FIG. 1 is an exploded perspective view of a vehicle light assembly embodying the present invention.

As illustrated in the accompanying drawing for purpose of illustration, the present invention resides in a vehicle light assembly referred to by the reference number 10. The design of the present invention is so effective that in some models, the number of LED's required for each assembly is only a fraction of those required in existing LED cluster models.

With reference now to FIG. 1, an assembly 10 embodying the present invention is illustrated. The assembly 10 includes a base 12 which cooperates with a lens 14 to house a ribbon of LED's 16 and a reflector 18. The assembly 10 is illustrated as round, although it is conceivable that other configurations could also be employed such as rectangular or even other configurations. The lens 14 is typically a traditional, relatively flat and planar lens as used in current models. The lens 14 is preferably comprised of ultraviolet stabilized Lexan or other appropriate glass or plastic material. The lens 14 need not be flat, and can incorporate optics as deemed necessary.

In the illustrated round configuration, the reflector 18 is of a bowl or disc-shape and includes a circumferential wall having spaced-apart apertures 22 formed therein. A strip 16 having LED's 24 attached to a flexible, conductive ribbon, such as copper ribbon, is used in this assembly 10. Each LED 24 is directed into the circular strip 16 and spaced from one another so as to correspond with the apertures 22 of the reflector 18. The flexible strip 16 is sized so as to encircle the circumferential wall 20 of the reflector 18, and dispose at least one LED 24 into each aperture 22 of the reflector 18, so that each LED 24 is oriented generally perpendicular to the circumferential wall 20. Typically, there is no circuit board, rather the LEDS 24 are crimped onto two flat copper strips of about 0.25" in width, and the ribbon wrapped around the perimeter of the reflector 18 so that the LEDS 24 extend through the apertures 22.

The reflector 18 includes a reflective protuberance 26 which extends upwardly from an interior surface of the reflector 18 and is generally centered with respect to the light emitting diodes 24. Although the protuberance 26 can be of different configurations, typically it is in the form of a multi-faceted cone structure, as illustrated.

The cone 26 is disposed in the center of the reflector 18 and includes a facet 28 facing each aperture 22. Each facet 28 preferably includes a concave depression 30 which is substantially aligned with each LED 22. Each facet and depression 28 and 30 are preferably formed at a 45 degree angle with respect to the LED 24.

The interior reflective surface of the reflector 18 is non-uniform and includes a plurality of ridges and dimples which serve to reflect and disperse the light emitted from each light emitting diode 26. More particularly, the reflector 18 includes partition ridges 32 descending in stepped fashion from the circumferential wall 20 between each aperture 22 to the cone 26. The partition ridges 32 are formed at a 45 degree angle with respect to the LED's 24 to optimize reflection and dispersion of light. The reflector 18 also includes base ridges 34 which descend in stepped fashion from each aperture 22 to the cone 26. Preferably, the base ridges 34 include a plurality of dimples 36, or other irregular surface, so as to reflect the light emitted from the light emitting diodes 24. The partition ridges 32 are elevated with respect to the base ridges 34. Each base ridge area 34 and adjoining partition ridges 32 form an angle which is preferably less than the light spread of the LED 24. For example, LED's typically have a light spread or splay of approximately 100 degrees. Thus, the area between the partition ridges 32 and base ridges 34 would be preferably less than 100 degrees in order to effectively reflect and disperse light. Other ridges 38 can be formed along the circumferential wall 20 as the need dictates. These ridges 38 preferably also have 45 degree angles.

Thus, as light is emitted from the light emitting diode 24, a central portion of the light will strike the concave depression 30 and facet 28 of the cone 26 and be directed upwardly through the lens 14. Outer portions of the ray of light will encounter the angled partition ridges 22, base ridges 34 and irregularities 36 and be directed upwardly through the remainder of the lens 14. Light which is not immediately reflected upwardly through the lens 14 is subsequently reflected by the ridges 32 and 34 and dimples 36 and eventually exit through the lens 14. Thus, 100% of the light from the ray emitted by the LED 24 is reflected and dispersed through the lens 14.

The protuberance 26, and any facets or depressions 28 and 30 thereof, serve to direct the light emitted from the light emitting the LED's 24 at a central portion of the lens 14. Department of Transportation regulations require that a high degree of the light emitted from a light assembly of a vehicle be emitted through a central portion of a lens. The protuberance 26 meets these regulations. However, the reflection of the remaining light, due to the ridges 32 and 34, as well as the surface irregularities 36 cause dispersion of the light through the lens 14 in a non-focused manner, causing the lens 14 to glow. This allows the use of as few as six LED's 24 in a four inch circular lens assembly 10. By contrast, existing four inch auto light assemblies incorporating LED's require up to sixty-two LED's to effectively light up the assembly.

The Department of Transportation regulations that were written in the 1970's, and updated in the 1980's, to require that the color of light emanating from such tail, clearance marker, or automobile signal lights be red or amber depending on the light. The present invention contemplates using LED's 24 which emit red, such as for tail lights, or amber, for side marker lights. The lens 14 can thus be clear. While this may desirable for cosmetic purposes, it also serves as a safety feature. For example, if the battery dies and the lights are inoperable, light from a trailing vehicle will enter and exit through the clear lens and be reflected from the reflector of the assembly 10 much easier than through a red or amber lens.

The present invention provides many advantages over existing LED cluster lighting assemblies. The assembly 10 of the present invention is considerably less expensive than existing assemblies due to the fact that fewer LED's are required. Although the assembly 10 uses fewer LED's, there is an overall increase in the amount of uniform light emitted from the assembly 10 due to the use of the reflector 18 configuration. The reflector 18 also increases the viewing angle of the light from the assembly 10, such that visibility is seen from a side angle of the assembly 10, and not only at a direct angle of the assembly.

Although an embodiment has been described in detail for purposes of illustration, various modifications may be made without departing from the scope and spirit of the invention. Accordingly, the invention is not to be limited except as by the appended claims.

What is claimed is:

1. A vehicle light assembly, comprising:

a plurality of light emitting diodes;

a reflector having apertures formed in a circumferential wall thereof configured to accept at least one light emitting diode therethrough in an orientation generally perpendicular to the circumferential wall, the reflector including multiple reflective ridges extending upwardly from an interior surface of the reflector, and a reflective protuberance extending upwardly from the interior surface of the reflector and centered with respect to the light emitting diodes; and a lens disposed over the reflector for allowing light to pass therethrough.

2. The assembly of claim 1, wherein the protuberance comprises a cone having multiple facets, each facet facing a respective light emitting diode for directing light from the light emitting diodes to the lens.

3. The assembly of claim 2, wherein the facets of the cone are directed at an approximately forty-five degree angle with respect to the light emitting diode.

4. The assembly of claim 2, including a concave depression formed in each facet and generally aligned with the respective light emitting diode.

5. The assembly of claim 1, wherein the multiple ridges extend upwardly from the interior surface of the reflector at approximately forty-five degree angles with respect to the light emitting diodes for directing the light emitted from the light emitting diodes to the lens.

6. The assembly of claim 2, wherein the multiple ridges comprise base ridges descending in stepped fashion from the apertures to the protuberance, and partition ridges being elevated with respect to the base ridges and descending in stepped fashion from the circumferential wall towards the protuberance.

7. The assembly of claim 6, wherein the base ridges include dimples formed therein for further dispersing the light.

8. The assembly of claim 1, wherein the lens is transparent and the light emitting diodes emit red or amber light.

9. An automobile reflector assembly, comprising:

a reflector having a plurality of apertures formed in a circumferential wall thereof;

light emitting diodes extending through the apertures of the reflector so as to be oriented generally perpendicular to the circumferential wall; and a lens disposed over the reflector and light emitting diodes;

wherein multiple ridges extend upwardly from an interior surface of the reflector at approximately forty-five degree angles with respect to the light emitting diodes for directing the light emitted from the light emitting diodes to the lens, the multiple ridges comprising base ridges descending in stepped fashion from the apertures to a central portion of the reflector, and partition ridges being elevated with respect to the base ridges and descending in stepped fashion from the circumferential wall towards the central portion of the reflector.

10. The assembly of claim 9, including a generally conical protuberance extending upwardly from an interior surface of the reflector and including multiple facets, each facet facing a respective light emitting diode for directing light from the light emitting diodes to the lens.

11. The assembly of claim 10, wherein the facets are directed at an approximately forty-five degree angle with respect to the light emitting diode.

12. The assembly of claim 10, including a concave depression formed in each facet and generally aligned with the respective light emitting diode.

13. The assembly of claim 9, wherein the base ridges include dimples formed therein for further dispersing the light.

14. An automobile reflector assembly, comprising:

a reflector having a plurality of apertures formed in a circumferential wall thereof;

light emitting diodes extending through the apertures of the reflector so as to be oriented generally perpendicular to the circumferential wall; and a lens disposed over the reflector and light emitting diodes;

wherein a generally conical protuberance extends upwardly from an interior surface of the reflector and includes multiple facets, each facet facing a respective light emitting diode for directing light from the light emitting diodes to the lens.

15. The assembly of claim 14, wherein the facets of the cone are directed at an approximately forty-five degree angle with respect to the light emitting diode.

16. The assembly of claim 15, including a concave depression formed in each facet and generally aligned with the respective light emitting diode.

17. The assembly of claim 14, including multiple ridges extending upwardly from an interior surface of the reflector at approximately forty-five degree angles with respect to the light emitting diodes for directing the light emitted from the light emitting diodes to the lens.

18. The assembly of claim 17, wherein the multiple ridges comprise base ridges descending in stepped fashion from the aperture to the protuberance, and partition ridges being elevated with respect to the base ridges and descending in stepped fashion from the circumferential wall towards the protuberance.

19. The assembly of claim 18, wherein the base ridges include dimples formed therein for further dispersing the light.

20. An automobile reflector assembly, comprising:

a reflector having a plurality of apertures formed in a circumferential wall thereof;

light emitting diodes extending through the apertures of the reflector so as to be oriented generally perpendicular to the circumferential wall; and a lens disposed over the reflector and light emitting diodes;

wherein multiple ridges extend upwardly from an interior surface of the reflector at approximately forty-five degree angles with respect to the light emitting diodes, and a generally conical protuberance extends upwardly from the interior surface of the reflector and includes multiple facets each facet facing a respective light emitting diode for directing light from the light emitting diodes to the lens.

21. The assembly of claim 20, wherein the facets are directed at an approximately forty-five degree angle with respect to the light emitting diode.

22. The assembly of claim 20, including a concave depression formed in each facet and generally aligned with the respective light emitting diode.

23. A vehicle light assembly, comprising:

a plurality of light emitting diodes; and a reflector having a circumferential wall configured to accept at least one light emitting diode in an orientation generally perpendicular to the circumferential wall, the reflector including multiple reflective ridges extending upwardly from an interior surface of the reflector, and a reflective protuberance extending upwardly from the interior surface of the reflector and centered with respect to the light emitting diodes.

24. The assembly of claim 23, wherein the protuberance comprises a cone having multiple facets, each facet facing a respective light emitting diode.

25. The assembly of claim 24, wherein the facets of the cone are directed at an approximately forty-five degree angle with respect to the light emitting diode.

26. The assembly of claim 24, including a concave depression formed in each facet and generally aligned with the respective light emitting diode.

27. The assembly of claim 23, wherein the multiple ridges extend upwardly from the interior surface of the reflector at approximately forty-five degree angles with respect to the light emitting diodes.

28. The assembly of claim 24, wherein the multiple ridges comprise base ridges descending in stepped fashion from the apertures to the protuberance, and partition ridges being elevated with respect to the base ridges and descending in stepped fashion from the circumferential wall towards the protuberance.

29. The assembly of claim 28, wherein the base ridges include light-dispersing dimples formed therein.

* * * * *